(12) United States Patent
Africa, Jr. et al.

(10) Patent No.: US 8,914,253 B2
(45) Date of Patent: Dec. 16, 2014

(54) AERIAL BOGEY DISCRIMINATION TECHNIQUE

(75) Inventors: James H. Africa, Jr., Fredericksburg, VA (US); Thomas G. Poley, King George, VA (US); Joshua C. Hickland, Falmouth, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 482 days.

(21) Appl. No.: 12/930,168

(22) Filed: Dec. 8, 2010

(65) Prior Publication Data

US 2012/0316824 A1    Dec. 13, 2012

Related U.S. Application Data

(60) Provisional application No. 61/336,131, filed on Jan. 15, 2010.

(51) Int. Cl.
*G06F 15/00* (2006.01)
*F41H 11/02* (2006.01)
*G01S 7/41* (2006.01)
*G01S 13/72* (2006.01)

(52) U.S. Cl.
CPC ............... *F41H 11/02* (2013.01); *G01S 7/415* (2013.01); *G01S 13/723* (2013.01)
USPC .......................................................... 702/144

(58) Field of Classification Search
USPC ........................................................ 702/144
See application file for complete search history.

(56) References Cited

U.S. PATENT DOCUMENTS

| 6,022,037 A | 2/2000 | Code ............................ 280/303 |
| 6,643,588 B1 | 11/2003 | Ibrahim ....................... 701/301 |
| 2012/0316823 A1* | 12/2012 | Africa et al. .................. 702/141 |

OTHER PUBLICATIONS

G. Brian, "Aerial Combat Maneuver Identification—A Feasibility Study of an Intelligent Decision Support System", AMRL, Sim-TecT 2000 Conference.

* cited by examiner

*Primary Examiner* — Tung S Lau
(74) *Attorney, Agent, or Firm* — Gerhard W. Thielman, Esq

(57) ABSTRACT

A computer-implemented analysis method is provided for identifying a flight trajectory of a bogey relative to earth's surface. The method includes a first step of obtaining first and second altitudes and velocities of the bogey separated by a first time interval. The second step calculates a first difference between the first and second velocities divided by the first time interval to obtain an acceleration vector. The third step determines the direction of the velocity vector. The fourth step determines whether direction of the second velocity vector exceeds an upward pointing threshold. The fifth step determines whether the acceleration vector is negative and substantially perpendicular to earth's surface as a second result being valid. The sixth step reports that the bogey represents a ballistic projectile in response to the first and second results.

5 Claims, 14 Drawing Sheets

SIDE VIEW

| TARGET TYPE 210 | VELOCITY TimeStep 220 | | FPA (degrees) TimeStep 230 | | APA (Degrees) TimeStep 240 |
|---|---|---|---|---|---|
| | i | i+1 | i | i+1 | i+1 |
| BOTTLE ROCKET (BOOST) 250 | $\begin{pmatrix} 0 \\ 0 \\ 0 \end{pmatrix}$ t=0s | $\begin{pmatrix} 5.2 \\ 0 \\ 9.5 \end{pmatrix}$ t=1s | NA | 61.3 | 61.3 |
| BOTTLE ROCKET (END OF BOOST) 260 | $\begin{pmatrix} 46.6 \\ 0 \\ 85.7 \end{pmatrix}$ t=9s | $\begin{pmatrix} 51.8 \\ 0 \\ 95.2 \end{pmatrix}$ t=10s | 61.5 | 61.5 | 61.3 |
| BOTTLE ROCKET (ASCENT) BOOST OFF 270 | $\begin{pmatrix} 51.8 \\ 0 \\ 85.4 \end{pmatrix}$ t=11s | $\begin{pmatrix} 51.8 \\ 0 \\ 75.6 \end{pmatrix}$ t=12s | 58.8 | 55.6 | -90 |
| BOTTLE ROCKET (ASCENT TO DESCENT) 280 Through apogee | $\begin{pmatrix} 51.8 \\ 0 \\ 7 \end{pmatrix}$ t=19s | $\begin{pmatrix} 51.8 \\ 0 \\ -2.8 \end{pmatrix}$ t=20s | 7.7 | -3.1 | -90 |
| BALSA WOOD AIRPLANE 290 | $\begin{pmatrix} 5.2 \\ 0 \\ 0 \end{pmatrix}$ | $\begin{pmatrix} 5.2 \\ 0 \\ 0 \end{pmatrix}$ | 0 | 0 | NA |

Fig. 2

SIDE VIEW

The new velocity components are calculated from:
- VNew(1) = C*Ex*(Ex*Vx+Ey*Vy)+Ey*(-Ey*Vx+Ex*Vy)+Z*Ex*Vz, and
- VNew(2) = -C*Ey*(Ex*Vx+Ey*Vy)+Ex*(-Ey*Vx+Ex*Vy)-Z*Ey*Vz.
- VNew(3) = -Z*(Ex*Vx+Ey*Vy)+C*Vz
- In these equations:
    - Vx, Vy, Vz are the original given components of velocity.
    - Ex and Ey are calculated by
        - Ex=Rx/Rh and
        - Ey=Ry/Rh, where
        - Rx and Ry are the original position components, and
        - Rh=sqrt(Rx^2+Ry^2)
        - Rh is the total horizontal range to the initial position.
    - C and Z are calculated bases on radius of a sphere (Re), the original z component of position (Rz), and the original altitude (Alt) as follows:
        - C = (Re+Rz)/(Re+Alt)
        - Z = (Rh/Re)

The new angle is calculated from the components given above as:
- Calculate Total speed in the new frame as:
    - NewS = sqrt(VNew(1)^2+VNew(2)^2+VNew(3)^2) ;
    - Note: This part of the calculation should not be needed since speed is invariant under the transformations we are considering. Speed has already been calculated in the old coordinate system.
- Horizontal component of speed in the new frame as:
    - NewVh = sqrt(VNew(1)^2+VNew(2)^2) ;
- Finally, new angle calculated from                                    610
    - NewAngle1=acos(NewVh/NewS) ;

Algorithm would be:
- Given: Rx, Ry, Rz, Vx, Vy, Vz, Re, and Alt                            620
- Calculate intermediates
    - Ex=Rx/Rh
    - Ey=Ry/Rh,
    - Rh=sqrt(Rx^2+Ry^2)
    - C = (Re+Rz)/(Re+Alt)
    - Z = (Rh/Re)
- Calculate new velocity vector
    - VNew(1) = C*Ex*(Ex*Vx+Ey*Vy)+Ey*(-Ey*Vx+Ex*Vy)+Z*Ex*Vz, and
    - VNew(2) = -C*Ey*(Ex*Vx+Ey*Vy)+Ex*(-Ey*Vx+Ex*Vy)-Z*Ey*Vz.
    - VNew(3) = -Z*(Ex*Vx+Ey*Vy)+C*Vz
    - NewVh = sqrt(VNew(1)^2+VNew(2)^2)
    - NewS = sqrt(VNew(1)^2+VNew(2)^2+VNew(3)^2)
    - (NewS MAY NOT BE NEEDED if old speed is known, since they will be the same.)
- Report result:
    - NewAngle1=sign(VNew(3))*acos(NewVh/NewS)

Fig. 6B

```
%syms Vx Vy Vz Rx Ry Rz A Re
Function [NewAngle1, NewAngle2, NewAngle3, VNew, Times] = NewVertAngle (Velocity, Position, Alt)
%
% Written by: Jim Africa          Modified: October 24, 2008
% Modified by:                    Last Modified:
%
% NewVertAngle evaluates angle of a velocity vector against a local
% horizontal located at the input position vector.
% Alt is calculated outside the routine, but is expected to be consistent
% with the input position vector.
%
% Inputs -
%    Velocity - velocity vector for target
%    Position - position vector for target
%    Alt - altitude
%
% Outputs -
%    NewAngle1 - angle as determined by method J (all names are arbitrary)
%    NewAngle2 - angle as determined by method K
%    NewAngle3 - angle as determined by method L
%    VNew - new velocity vector
%
% BEGIN
%
% Extract cut Speed. This quantity should be invariant under the
% unitary transformation.
%
Re = 6376388 ;
Vx = Velocity (1) ;
Vy = Velocity (2) ;
Vz = Velocity (3) ;
Rx = Position (1) ;
Ry = Position (2) ;
```

7/29/09 4:00 PM D:\DataMineF-disk\TimeSync 2008 CV2 IMM EKE Sensor Sync Error Gy...\NewVertAngle.in    2 of 5

720

```
Rz = Position (3) ;
tic % start timer for method 1
%
% Method 1
%
alpha2 = acos ((Rz + Re) / (Alt + Re)) ;   % Determines tilt of local coordinate system
Rh         = sqrt (Rx^2+Ry^2) ;            % observed horizontal range
OldBasisRH  =Rx/Rh; Ry/Rh; 0] ;            % unit vector in horizontal plane in direction of target
%OldBasisRp = cross OldBasisZ, OldBasisRh) ; % from det (ijk, Rh, z)
OldBasisRp  = [-Ry/Rh; Rx/Rh; 0] ;         % unit vector in horizontal plane normal to direction of target
OldBasisZ = [0;0;1] ;                      % unit vector in local vertical direction
                                           % all expressed in given coordinates
```
} 722

```
%
% Express target velocity in the constructed intermediate radial aligned
% Rh,Rp,Rz coordinate system
%
VOld = [OldBasisRh.';OldBasisRp.';OldBasisZ.']*[Vx;Vy;Vz] ;
%
% Develop matrix to support coordinate conversion from the
% local intermediate coordinate system to the target intermediate
% horizontal coordinate system. By our construction this will effect only
% our Rh, and Rz unit vectors.
%
```
} 724

```
Rotator = [cos(-alpha2) 0 -sin(alpha2) ;
           0            1  0          ;
           sin(-alpha2) 0 cos(-alpha2) ] ;
% Develop representation for the remote target system coordinate basis,
% expressed in local system radial aligned coordinates.
%
%             [ehat-Rh]
%New Basis = M + [ehat-Rp]
%             [ehat-z]
```
} 726

Fig. 7B

```
%
NewBasisRh = Rotator*OldBasisRh ;
NewBasisRp = Rotator*OldBasisRp ;
NewBasisZ = Rotator*OldBasisZ ;
%
% Now develop the projection operator for a vector from the intermediate
% aligned coordinates to the new coordinate system.
%
Projector = [NewBasisRh.';
             NewBasisRp.';
             NewBasisZ.'] ;                                          } 732
%
% And finally, develop the velocity coordinates for a target horizontal
% radial aligned coordinate system.
%
VNew = Projector*VOld;                                               } 734
%
% Heavy work is over. No need to go to fill remote coordinates since we only seek the angle.
% So now just calculate the full and horizontal portions
% of the velocity, and use those to develop angle with respect to the
% target centric horizontal coordinate system.
NewS = sqrt(VNew(1)^2+Vnew(2)^2+VNew(3)^2) ;                         } 736
%
% Use the fact that the speed should be invariant under this transformation
% to do a gut-check here, to ensure we didn't mess something up.
%
% if ((NewS-S) > 1e-6)
%       fprintf('\n Conversion Error\n') ;
% end
NewVh = sqrt(Vnew(1)^2+VNew(2)^2) ;                                  } 738
%
% And finally, the angle should be
```

Fig. 7C

7/29/09 4:00 PM D:\DataMine\F-disk\TimeSync 2008 CV2 IMM EKE Sensor Sync Error Gy...\NewVertAngle.in     4 of 5

```
%
NewAngle1 = sign (VNew(3)) * acosd (NewVh/NewS) ;
TimeMethod1 = toc;
%
% Method 2 - much less computation intensive approximation of true
%
tic % start timer for method 2
S = sqrt(Vx^2 + Vy^2 + Vz^2) ;   % speed
Vh = sqrt Vx^2 = Vy^2) ;          % observer horizontal velocity
alpha1 = sign (Vz) + acoa (Vh/S) ; % Determines angle off of horizontal
alpha2 = acos ((Rz + Re) / (Alt + Re)) ; % Determines tilt of local coordinate system
NewAngle2 = (alpha1 + alpha2 * (Rx*Vx+Ry*Vy) / (Rh*Vh)) * 180/pi ;
TimeMethod2 = toc ;
%
% method 3 - Same as method 1 but without all of the info about rotating or
% making basis vectors doing projections, just the equations;
%
% First Calc Intermediate variables
tic
Rh=sqrt(Rx^2+Ry^2) ;
Ex=Rx/Rh ;
Ey=Ry/Rh ;
C = (Re+Rz) / (Re+Alt) ;
Z = -(Rh/Re) ;
EdotV_x=Ex*Vx+Ey*Vy;
EdotV_y=Ey*Vx+Ex*Vy;
% Calculate new velocity vector
VNew(1) = C*Ex*(EdotV_x) +Ey* (EdotV_y) +Z*Ex*Vz ;
VNew(2) = -C*Ey*(EdotV_x) +Ex* (EdotV_y) -Z*Ey*Vz ;
VNew(3) = -Z*(EdotV_x) +C* Vz ;
%
%
then calculate horizontal component and total speed
%
```

```
7/29/09 4:00 PM  D:\DataMine\F-disk\TimeSync 2008 CV2 IMM EKE Sensor Sync Error Gy...\NewVertAngle.in    5 of 5

NewVh = sqrt(VNew(1)^2+VNew(2)^2) ;
NewS = sqrt(VNew(1)^2+VNew(2)^2+VNew(3)^2) ;
% (NewS MAY NOT BE NEEDED if old speed is known, since they will be the same. If so add NewS to the input)
NewAngle3=sign(VNew(3))*acosd (NewVh/NewS) ;                                              } 755
TimeMethod3 = toc ;
Times = [TimeMethod1 TimeMethod2 TimeMethod3] ;
%NewAngle3 = (Alpha1+ Alpha2* (Px*Vx+Ry*Vy) / (Rh*S )) * 180/pi ;
%
%
% Some commented out intermediate results.
%
% fprintf (' Position %7.4f %7.4f %7.4f Velocity %7.4f %7.4f %7.4f ', Position, Velocity ) ;
% fprintf ('\n OLD: ' ) ;
% fprintf (' %7.4f %7.4f %7.4f %7.4f %7.4f %7.4f %7.4f\n' , OldBasisRh, Vh ) ;
% fprintf ('\n New: ' ) ;
% fprintf (' %7.4f %7.4f %7.4f %7.4f %7.4f %7.4f %7.4f\n' , NewBasisRh, NewVh ) ;
% fprintf ('\n ' ) ;
```

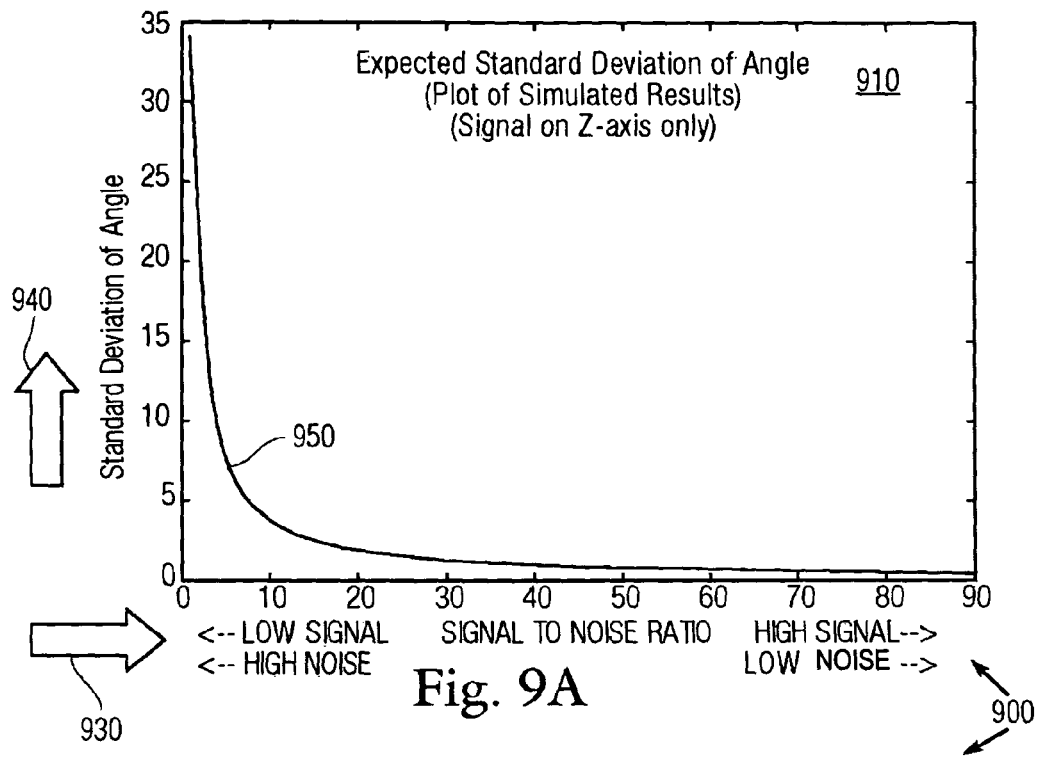
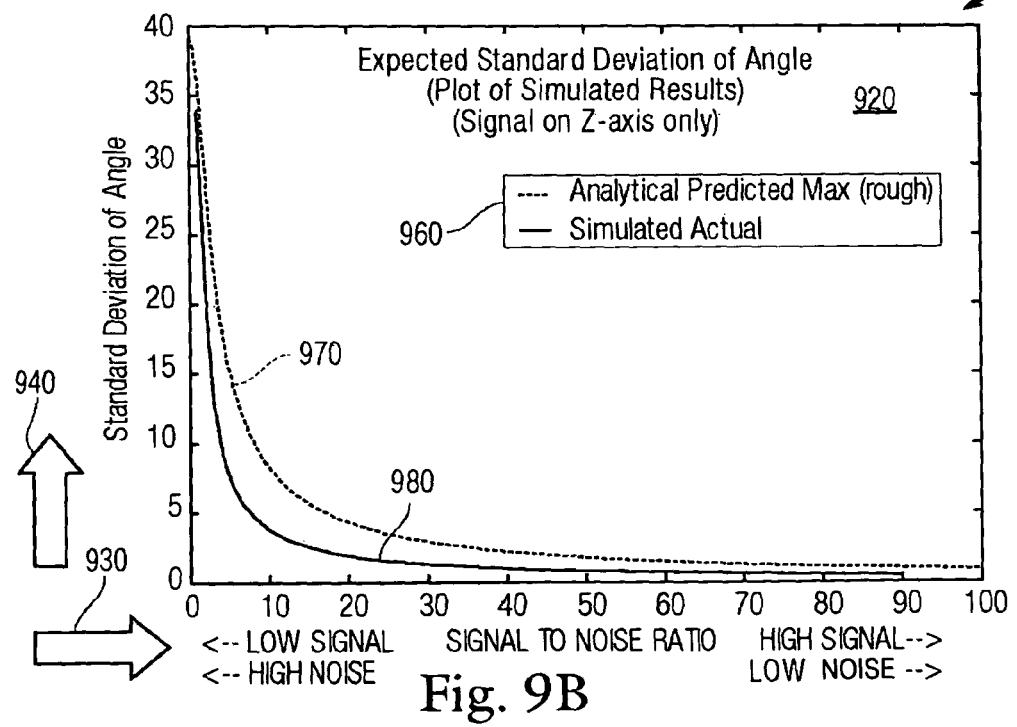

US 8,914,253 B2

AERIAL BOGEY DISCRIMINATION TECHNIQUE

CROSS REFERENCE TO RELATED APPLICATION

Pursuant to 35 U.S.C. §119, the benefit of priority from provisional application 61/336,131, with a filing date of Jan. 15, 2010, is claimed for this non-provisional application.

STATEMENT OF GOVERNMENT INTEREST

The invention described was made in the performance of official duties by one or more employees of the Department of the Navy, and thus, the invention herein may be manufactured, used or licensed by or for the Government of the United States of America for governmental purposes without the payment of any royalties thereon or therefor.

BACKGROUND

The invention relates generally to discrimination of aerial bogeys. In particular, the invention relates to techniques to distinguish between ballistic and flat trajectory airborne vehicles and categorize accordingly for appropriate interception response.

An unidentified aerial object or "bogey" represents a prospective threat to a defended asset. To intercept the threat as a target, the defender must categorize ballistic trajectories on the basis of intermittent observation of an object's trajectory. This has represented a difficult problem by conventional analysis techniques using observably available data.

SUMMARY

Conventional techniques for categorizing intermittently observed object trajectories yield disadvantages addressed by various exemplary embodiments of the present invention. In particular, various exemplary embodiments provide an indication of apparent acceleration direction with respect to an object's local horizontal plane associated with the intermittently observed object trajectory.

Various exemplary embodiments provide a computer-implemented analysis method to identify a flight trajectory of a bogey relative to earth's surface. The method includes a first step of obtaining first and second altitudes and velocities of the bogey separated by a first time interval. The second step calculates a first difference between the first and second velocities divided by the first time interval to obtain an acceleration vector. The third step determines the direction of the velocity vector.

The fourth step determines whether direction of the second velocity vector exceeds an upward pointing threshold. The fifth step determines whether the acceleration vector is negative and substantially perpendicular to earth's surface as a second result being valid. The sixth step reports that the bogey represents a ballistic projectile in response to the first and second results. Various additional embodiments provide transformations to aid in processing the vector information.

BRIEF DESCRIPTION OF THE DRAWINGS

These and various other features and aspects of various exemplary embodiments will be readily understood with reference to the following detailed description taken in conjunction with the accompanying drawings, in which like or similar numbers are used throughout, and in which:

FIG. 2 is a tabular view of comparing flight path characteristics;

FIGS. 6A and 6B are text views of MATLAB code of variable definitions and associated calculations;

FIGS. 7A through 7E are text views of annotated MATLAB code for the process;

FIGS. 9A and 9B are graphical plot views of standard deviation variation with signal-to-noise.

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

In accordance with a presently preferred embodiment of the present invention, the components, process steps, and/or data structures may be implemented using various types of operating systems, computing platforms, computer programs, and/or general purpose machines.

In addition, those of ordinary skill in the art will readily recognize that devices of a less general purpose nature, such as hardwired devices, or the like, may also be used without departing from the scope and spirit of the inventive concepts disclosed herewith. General purpose machines include devices that execute instruction code. A hardwired device may constitute an application specific integrated circuit (ASIC) or a floating point gate array (FPGA) or other related component.

Conventional techniques for bogey identification rely on additional information beyond observations of the object's trajectory. Conventional techniques include independent indicators that the object's trajectory is accelerating or that the object's altitude is above earth's surface. Such techniques potentially assume that the object's behavior is associated with the object's position. This condition is not always valid, which can lead to interception failure. The instant disclosure describes a technique for categorizing ballistic tracks based on a sequence of system reports of a target's velocity.

Figure 1:
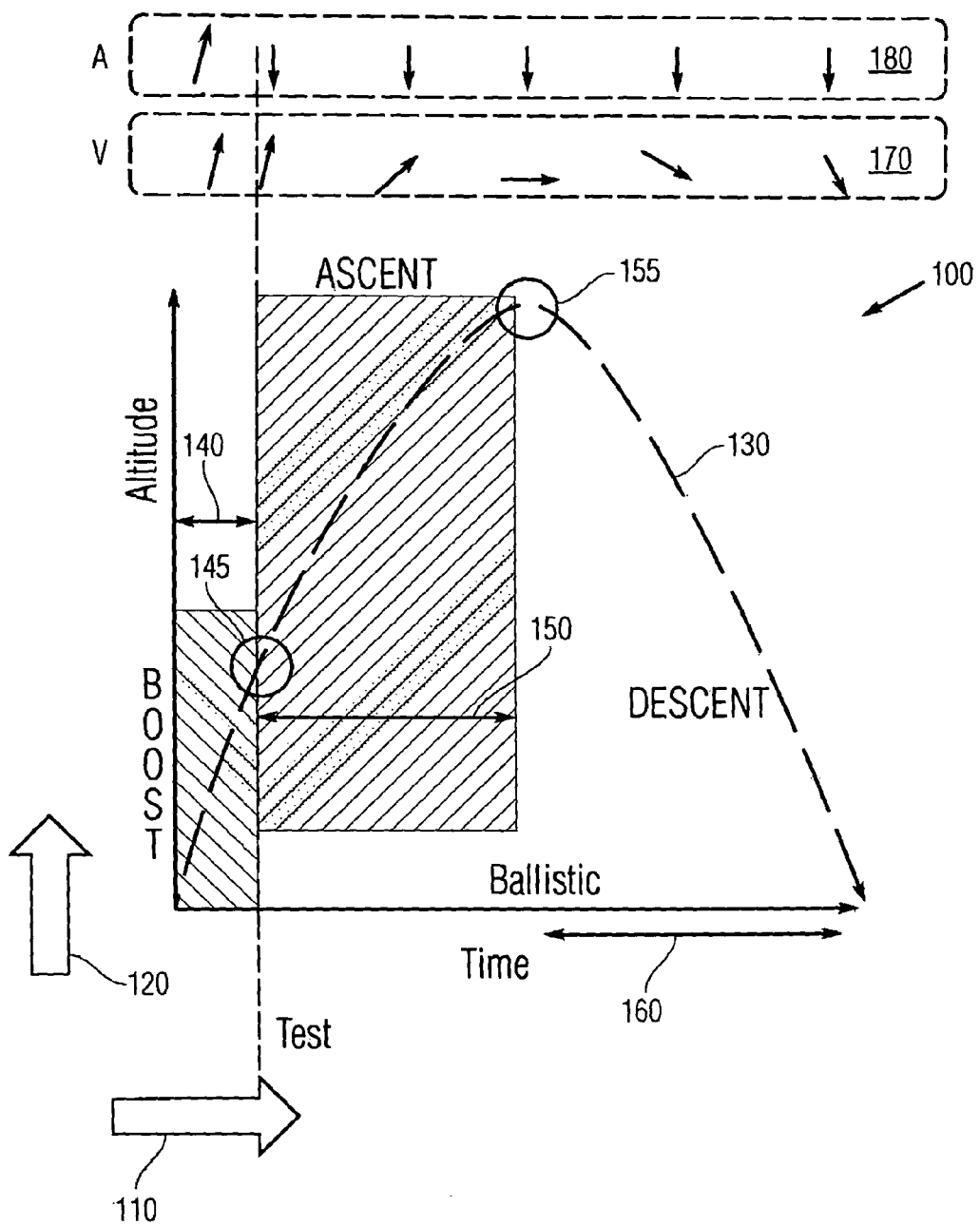
FIG. 1 is a graphical diagram view of a ballistic trajectory.

FIG. 1 shows a diagram view 100 of a notional ballistic trajectory for an object such as a missile. For such an object, the overall trajectory can be divided into three phases labeled as BOOST, ASCENT, and DESCENT. Time represents the abscissa 110 and altitude represents the ordinate 120. An inverse parabolic dash line 130 represents the notional trajectory for an exemplary rocket launched missile. While the rocket fires, the missile operates in boost mode (or interval) 140 until motor cutoff 145. The missile continues to climb in altitude due to inertia during the coast ascent mode 150 until reaching apogee 155. Thereafter, gravity overcomes the initial launching force and the missile proceeds downward in altitude during descent mode 160.

For the notional diagram view 100, the ASCENT—and DESCENT phases correspond to ballistic motion phases of the trajectory. Observed velocity and acceleration vector quantities have distinct characteristics during each phase:

BOOST—During boost mode 140 until burnout 145, acceleration points up, close to the direction of the velocity, which may approach vertical in the upward direction.

ASCENT—During coast 150 (after boost) and through apogee 155, acceleration points down, while velocity gradually changes from up to horizontal.

DESCENT—During descent 160, both quantities point down, with velocity changing from horizontal to potentially near vertical down.

In the diagram view 100, lower arrows 170 on the V-line indicate the velocity direction, while upper arrows 180 on the A-line indicate the acceleration direction. For aircraft trajectories having constant velocity, the acceleration is substantially zero (for all directions, in comparison to a ballistic missile). These considerations enable development of a procedure to distinguish between ballistic and non-ballistic type trajectories.

The following information describes an algorithmic process for calculating the velocity and acceleration directions of a bogey, referred to herein as a "target" generally. The process starts with an observed (or calculated) velocity data stream. The process then tests those values to determine transition from BOOST phase to ASCENT intervals for purpose of categorizing the velocity data stream as representative of a ballistic-type trajectory. The analysis assumes that input velocity stream is or can be represented in the coordinate system horizontal to the earth surface at the target's position.

An observed target's velocity components can be transformed from the observed position and velocity coordinates to the target's coordinate system using supplementary formulae described subsequently. Within the target's frame, both the Flight Path Angle (FPA) and the Acceleration Path Angle (APA) formulae indicated herein may be applied to the transformed velocity coordinates.

The relative processes considered are described herein. Velocity vector components are provided in the axial (x), lateral (y) and vertical (z) directions for time increments denoting previous (i−1) and instant (i) described as arrays:

$$\begin{pmatrix} v_{x,i-1} \\ v_{y,i-1} \\ v_{z,i-1} \end{pmatrix} \text{ and } \begin{pmatrix} v_{x,i} \\ v_{y,i} \\ v_{z,i} \end{pmatrix}$$

for time values $t_{i-1}$ and $t_i$ for which velocity values of the target are available, in addition to altitude. Thus, at the instant interval i, the velocity components in the axial, lateral and vertical directions are respectively $v_{x,i}$, $v_{y,i}$ and $v_{z,i}$. When starting with position and velocity coordinates, the altitude can be determined directly from the position components and supplementary knowledge of the local earth's radius. Many different algorithms exist for doing this. In practice, the accuracy of altitude determination may affect the performance of the algorithmic process provided in the various exemplary embodiments when the velocity data are not initially provided in the target local horizontal coordinate system.

Based on these velocity vectors, the following steps can be performed:

(a) calculate flight path angle (also denoted as variable θ for under transform) in eqn. (1) for the instant time step (i) as:

$$FPA_i = \text{sign}(v_{z,i})\arccos\left(\frac{\sqrt{v_{x,i}^2 + v_{y,i}^2}}{\sqrt{v_{x,i}^2 + v_{y,i}^2 + v_{z,i}^2}}\right). \tag{1}$$

(b) calculate acceleration in eqns. (2), (3) and (4) for three directions as:

$$a_{x,i} = \frac{v_{x,i} - v_{x,i-1}}{t_i - t_{i-1}} \tag{2}$$

$$a_{y,i} = \frac{v_{y,i} - v_{y,i-1}}{t_i - t_{i-1}} \tag{3}$$

$$a_{z,i} = \frac{v_{z,i} - v_{z,i-1}}{t_i - t_{i-1}} \tag{4}$$

thereby defining the acceleration vector at each step i by the orthogonal components.

(c) based on the previous step, calculate acceleration path angle in eqn. (5) for the instant time step (i) as:

$$APA_i = \text{sign}(a_{z,i})\arccos\left(\frac{\sqrt{a_{x,i}^2 + a_{y,i}^2}}{\sqrt{a_{x,i}^2 + a_{y,i}^2 + a_{z,i}^2}}\right). \tag{5}$$

(d) apply logic check. A determination can be made that the bogey represents a ballistic missile for the following conditions: FPA significantly exceeds zero, APA approaches negative ninety degrees (−90°, meaning vertically downward), and altitude corresponds to being above regular commercial airliner traffic. Thus, IF (FPA>flying_up_angle) AND (APA<near_vertical_down) AND altitude is above normal commercial traffic altitude, THEN the conclusion can be rendered target_is_candidate_ballistic_missile for parameters having such values that reach that relevant threshold.

An exemplary comparison can be described for explanatory purposes. The examples include a bottle rocket and a balsa-wood toy airplane. The high-performance bottle rocket produces thrust against the force of gravity, causing the rocket to move upwards. During this BOOST phase 140, both gravity and thrust forces affect the rocket's motion. After exhaustion of its propellant at cutoff 145, the rocket continues upward until the gravity overcomes its inertia so as to reduce vertical ascent speed. This is labeled as the BALLISTIC ASCENT phase 150, during which gravity gradually overcomes the upward velocity until the rocket reaches its maximum height on an inverted parabolic trajectory. Upon the rocket reaching its peak at apogee 155, it begins to descend in the mode labeled as BALLISTIC DESCENT 160.

As a simplified numerical example, a massless bottle rocket exerting thrust to accelerate at 20 m/s² (meters-per-second-squared), with an acceleration angle of 75° from horizontal, and subject to 9.8 m/s² gravity, achieves a velocity vector (x, y, z) of $$\begin{pmatrix} 46.6 \\ 0 \\ 85.7 \end{pmatrix}$$

m/s after 9 seconds, and a velocity vector of $$\begin{pmatrix} 51.8 \\ 0 \\ 95.2 \end{pmatrix}$$

m/s after 10 seconds, assuming launch in the direction of the axial x-coordinate axis. The apparent FPA and APA both exceed 61° at end of boost (at 9 seconds). Immediately after boost, FPA slowly decreases, and APA reaches −90°. This contrasts with a toy airplane having continuous velocity vector of $$\begin{pmatrix} 5.2 \\ 0 \\ 0 \end{pmatrix},$$

indicating a flat non-accelerating horizontal flight path.

FIG. 2 provides a table of values 200 to distinguish the above exemplary target types of bottle rocket and toy airplane in target type column 210. Velocity time-step columns 220 list intervals of mode shifts at time steps i and i+1. Similarly, FPA columns 230 list similar intervals in degrees for flight path, and APA column 240 lists similar degrees for acceleration. The table 200 provides progression of FPA and APA for the rocket and airplane at their respective operative modes.

For example, the rocket's boost mode 250 has initially zero velocity vectors, whereas these vectors are non-zero for end-of-boost 260, ascent 270 and descent 280. Thus, the rocket's FPA shifts from positive to slight negative after apogee 155, and its APA shifts from positive to negative vertical after cutoff 145. In addition, the airplane 290 exhibits constant velocity and no change in altitude, so that the airplane's FPA remains zero and its APA is indefinite.

The exemplary discriminator has the advantage of being applicable on the basis of a target velocity data stream. Additional target position data and knowledge of earth radius may be incorporated to support conversion of observed target data to local target coordinate system.

Conventional interpretation assumes that acceleration components derive from measured velocity values. However, these have large noise characteristics, and calculations based on observer based information have low reliability. Additionally, concern over ballistic threats has only recent origins as compared to airplanes, such as bomber aircraft, with design choices possibly influenced by computational capabilities of prior generation computers (comparatively slow), leading to reluctance to perform calculations that may have questionable reliability.

Results of investigation in support of exemplary embodiments indicate that despite high noise characteristics for acceleration quantities, the angle computed from these can be suitable to support categorization for ballistic type motion (even when noisy), resulting in the technique presented herein.

Conventional system results indicate less than 15% of a specific set of targets can be correctly categorized as ballistic. Based on desktop analysis using the same data stream applied to the exemplary algorithm, various exemplary embodiments improve this performance to over 90% being correctly categorized.

Figure 3:
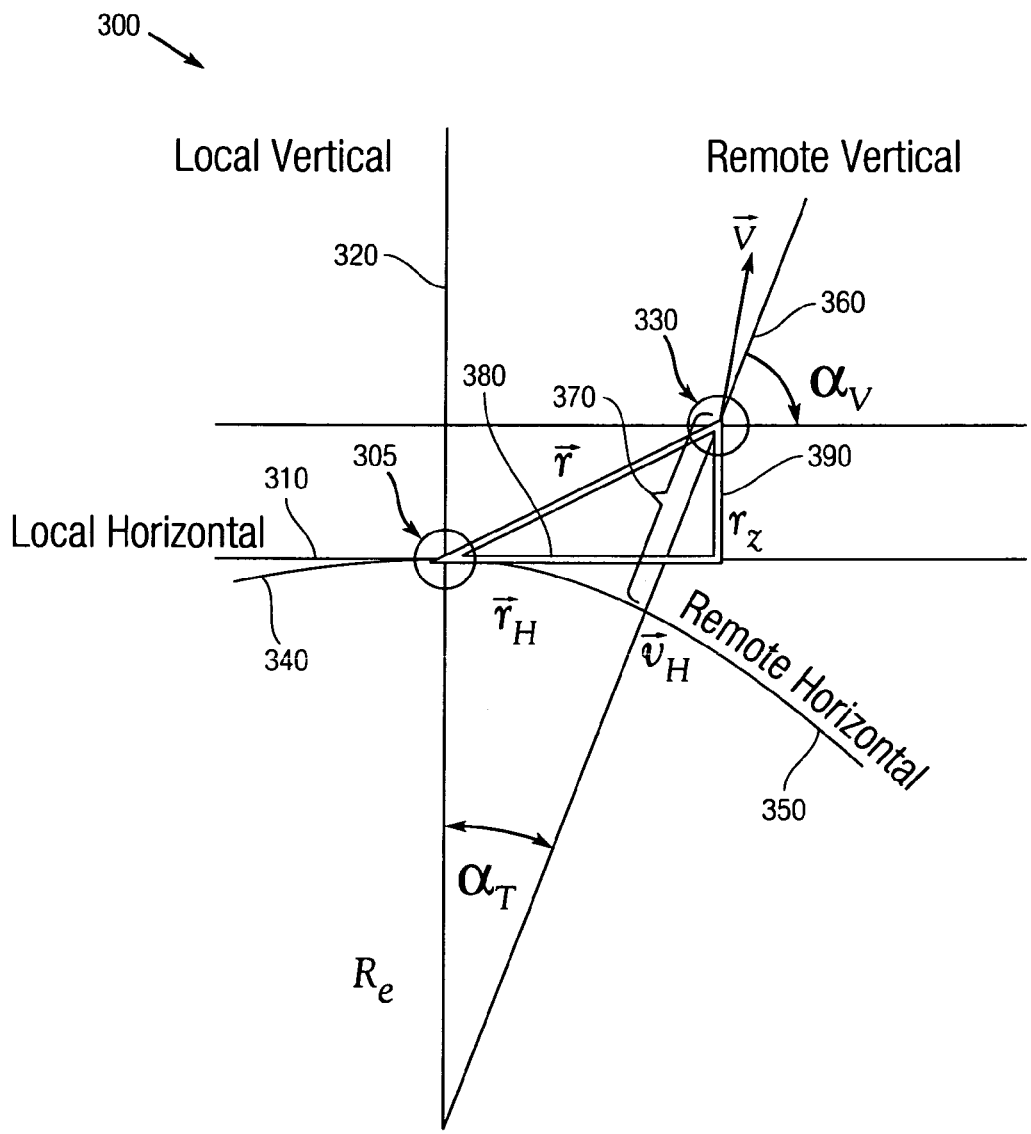
FIG. 3 is an elevation vector diagram view of relative coordinates.

FIG. 3 illustrates an elevation view 300 of frame comparison between local and remote coordinate systems. The local coordinates can be defined with respect to an observer's position 305 as a local horizontal 310 and a local vertical 320, with a target (or other object of interest) being initially located at intersection of these lines at position 330. The observer's position 305 can be described as radially distant from the earth's center by displacement vector $R_e$, and the target position 330 is angularly displaced from that vector by a transition angle $\alpha_T$. The target travels along its velocity vector $\vec{v}$ from an initial position 330 to a subsequent position.

Based on the earth's spheroidal surface 340, coordinates can be translated for the observer's position 305 to a remote horizontal 350 and a remote vertical 360. The elevation distance of the target's position 330 from the surface 340 can be expressed as altitude vector 370 from the surface 340. The remote vertical vector 370 is approximately collinear to the horizontal velocity vector $\vec{v}_H$, passing between the earth's center and the target position 330, and offset from the displacement vector $R_e$ by the transition angle $\alpha_T$.

From the observer's position 305, the local horizontal 310 and the local vertical 320 coordinates can translate to the remote horizontal 350 and the remote vertical 360 coordinates. Gravitational acceleration operates perpendicular to the surface 340 and thus along the local and remote verticals 320 and 370. The target's position 330 can be described relative to the observer's position as a distance vector $\vec{v}$ as a horizon distance vector $\vec{r}_H$ as line 380 and an elevation distance $\vec{R}_Z$ as line 390.

Formulae can be sought for the velocity angle $\alpha_V$ of velocity vector $\vec{v}$ with respect to the remote horizontal 350 to the spheroid surface 340 at the target position 330. Components of the velocity can be solved for the target horizontal coordinate system (THCS), labeled as Remote Horizontal. The following parameters can be defined:

$\vec{r}$ position vector coordinates of a target position 330, e.g., in local frame coordinates.

$\vec{v}$ velocity vector coordinates of the target position 330, e.g., in local frame coordinates.

alt altitude 370 above reference spheroid surface 340 at the target position 330.

The position vector $\vec{r}$ is provided in local frame coordinates: horizontal 310 and vertical 320 as $(r_x\ r_y\ r_z)^T$, in which superscript T denotes matrix transpose. Altitude 370 is provided at target position 330. Expectant angle between the local horizontal 310 and the target remote horizontal 350 is given by eqn. (6) as:

$$\alpha_T = \arccos\left(\frac{R_e + z}{R_e + alt}\right), \tag{6}$$

where $\alpha_T$ is the transition angle that denotes tilt between local and remote vertical axes, and $R_e$ is the earth's radius.

Figure 4:
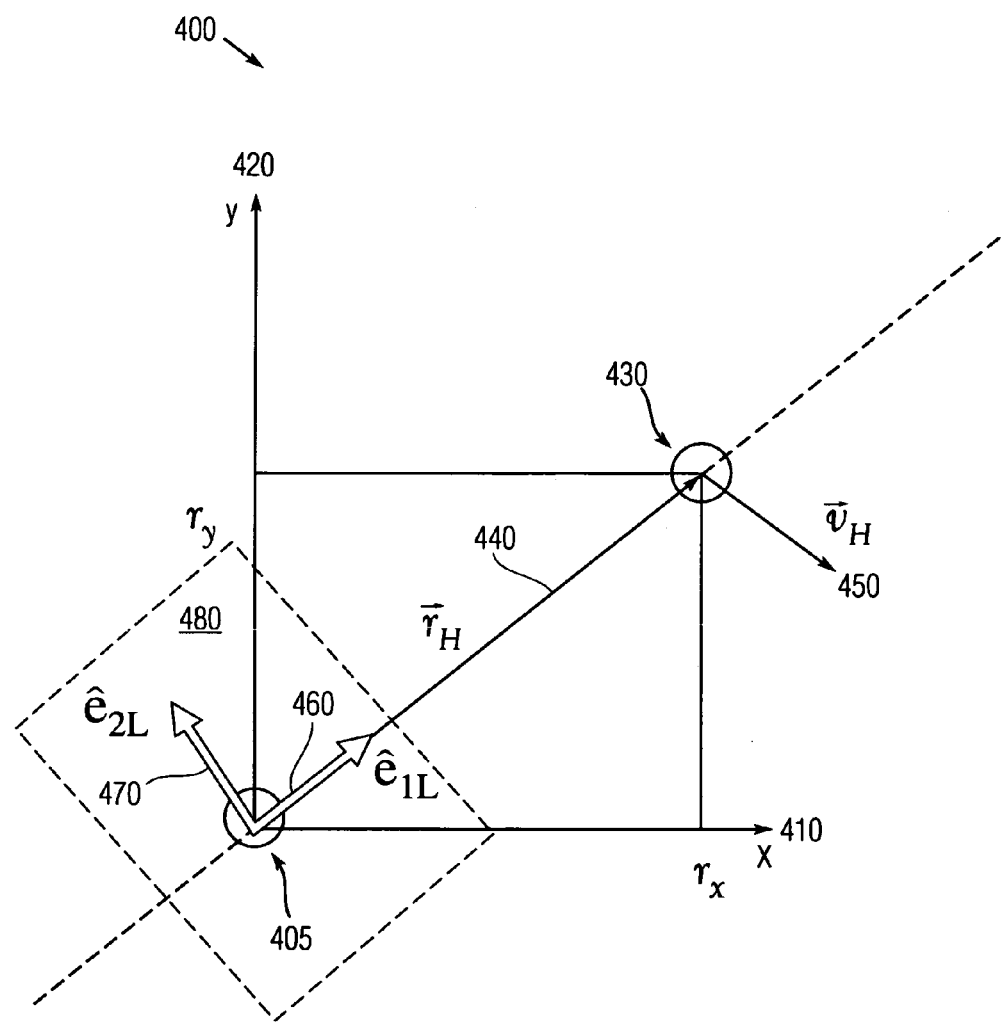
FIG. 4 is a vector diagram view of an intermediate coordinate system.

FIG. 4 illustrates vector diagram view 400 of frame comparison between local and intermediate coordinate systems. An observer position 405 corresponds to the position 305 in the elevation view 300. The horizontal x axis 410 and the vertical y axis 420 define the local coordinate system. A target position 430 corresponds to the horizontal components of the position 330 in the elevation view 300. A position vector $\vec{r}_R$ as line 440 denotes displacement to the target position 430 of the remote coordinate system from a local origin that corresponds to the observer's position 405, which corresponds to local coordinates $r_x$ and $r_y$. The vector line 440 corresponds to the horizontal components of the vector line 380 in elevation view 300. A velocity vector $\vec{v}_H$, as line 450, identifies the direction of travel from the remote target 430 in the horizontal plane.

A first local transition unit vector $\hat{e}_{1L}$, as line 460, aligns along the $\vec{r}_R$ position vector 440, associated with a second local transition unit $\hat{e}_{2L}$ vector, as line 470, orthogonal to the first within the plane of the x and y axes 410, 420. The unit vectors $\hat{e}_{1L}$, and $\hat{e}_{2L}$, define the horizontal portion of an intermediate coordinate system 480. The first unit vector $\hat{e}_{1L}$, as 460 lies collinear to the position vector $\vec{r}_{2L}$ as 440 from the observer position 405 to the target position 430. The transition vector $\hat{e}_{2L}$, as line 470, is perpendicular to $\hat{e}_{1L}$, as line 460, but also lies within the original local horizontal plane.

Figure 5:
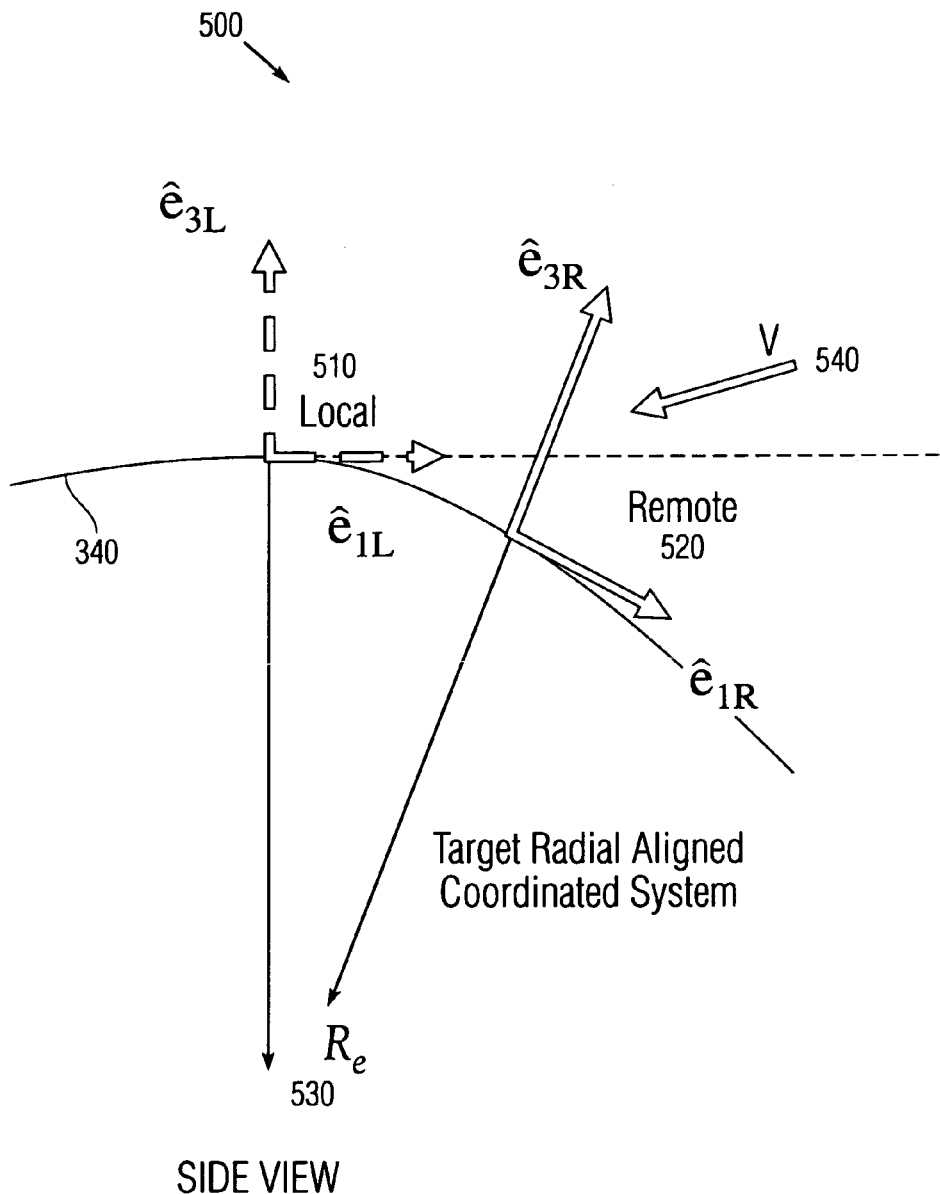
FIG. 5 is an elevation vector diagram view of coordinate transformation.

FIG. 5 illustrates an elevation view 500 of frame comparison between local and remote coordinate systems. A local system 510 includes the first transition unit vector $\hat{e}_{1L}$, tangent along the spheroidal surface 340 and a third transition unit vector $\hat{e}_{3L}$ vertically orthogonal to the first (as opposed to the second unit vector $\hat{e}_{2L}$ as line 460 being in the same plane as the surface 340). Consequently, these first, second and third local unit vectors correspond to local axial, lateral and vertical directions.

A remote system 520 includes a horizontal transition unit vector $\hat{e}_{1R}$, also tangent along the surface 340, and a vertical transition unit vector $\hat{e}_{3R}$ parallel to earth radius $R_e$ as line 530. A local target velocity vector $\vec{v}_T$ as line 540 represents a velocity whose components are known within the local coordinate system, but whose components have not yet been determined within the remote coordinate system.

The intermediate coordinate system 480 transforms the local coordinate system 510 to the (non-standard) remote coordinate system 520. Construction of the intermediate coordinate system 480 provides for the $\hat{e}_{1L}$, axis to run from the origin of the local coordinate system 510 in the direction of the target position 330, while both unit vectors $\hat{e}_{1L}$ and $\hat{e}_{2L}$, remain in the original local horizontal plane. The remote coordinate system 520 represents a subsequent portion of the transformation involving transformation using the transition angle $\alpha_T$, described subsequently.

Generally, obtaining the flight path angle θ with respect to horizontal plane involves determining the components of the velocity vector $\vec{v}$ in the plane of the local horizontal 310, then performing the calculation of eqn. (7):

$$\theta = \arccos\left(\frac{|\vec{v}_H|}{|\vec{v}|}\right), \quad (7)$$

where $|\vec{v}|$ and $|\vec{v}_H|$ represent respective absolute magnitudes of the velocity and vertical velocity component. The flight path angle θ corresponds to the vector velocity angle $\alpha_V$.

This calculation can be used in either local frame coordinates 510 or remote frame coordinates 520, with the former employed in this example. These can be transformed to the remote frame coordinates 520 (through the intermediate coordinate system 480). New coordinates can be developed by defining an intermediate set of coordinates 480 that are aligned with the radial vector between the two coordinate systems (in this case target position vector), $\vec{r}$) and apply the transformation from local to target frame using the transition angle $\alpha_T$. The process for accomplishing this is described below.

First, the local intermediate frame coordinate axes $\hat{e}_{iL}$ (where subscript i represents the three orthogonal coordinates 1, 2, 3) can be developed from the position vector coordinates for all three directions, given by eqn. (8):

$$\hat{e}_{1L} = \left(\frac{r_x}{r_h} \quad \frac{r_y}{r_h} \quad 0\right)^T, \quad (8)$$

$$\hat{e}_{2L} = \left(-\frac{r_y}{r_h} \quad \frac{r_y}{r_h} \quad 0\right)^T,$$

$$\hat{e}_{3L} = (0 \quad 0 \quad 1)^T,$$

where radial distance is defined by $r_h = \sqrt{r_x^2 + r_y^2}$.

This defines a local intermediate coordinate system 520 whose coordinates are represented in the local frame coordinate system 510. In this system, the unit vector $\hat{e}_{1L}$, lies in the horizontal plane in the direction of the target. The unit vector $\hat{e}_{3L}$ lies along the local tangent plane vertical axis. The unit vector $\hat{e}_{2L}$, also lies in the horizontal plane and is perpendicular to the other two vectors ($\hat{e}_{1L}$, and $\hat{e}_{3L}$).

The target velocity vector $\vec{v}_T$ 540 can be denoted in the local radial aligned system 520. The calculation for intermediate velocity vector v, is given by eqn. (9):

$$\vec{v}_I = \begin{pmatrix} \vec{v} \cdot \hat{e}_{1L} \\ \vec{v} \cdot \hat{e}_{2L} \\ \vec{v} \cdot \hat{e}_{3L} \end{pmatrix}, \quad (9)$$

such that the velocity vector $\vec{v}_T$ constitutes the locally expressed object velocity $\vec{v}$ (in the local horizontal frame) dot multiplied for each component along each local unit vector.

The transformation through the transition angle $\alpha_T$ occurs along the radial about the unit vector $\hat{e}_{2L}$. The transformation can be written as eqn (10):

$$M = \begin{pmatrix} \cos(-\alpha_T) & 0 & -\sin(-\alpha_T) \\ 0 & 1 & 0 \\ \sin(-\alpha_T) & 0 & \cos(-\alpha_T) \end{pmatrix}, \quad (10)$$

where M represents the transformation from the intermediate coordinate system 480 to the target horizontal coordinate system 520 (i.e., Remote Horizontal). This applies to the vectors whose coordinates are presented in the intermediate coordinate system 480. So, basis transition vectors ($\hat{e}_{1R}$ $\hat{e}_{2R}$ $\hat{e}_{3R}$) for the target radial aligned coordinates are formed through the calculations by eqn. (11):

$$(\hat{e}_{1R} \quad \hat{e}_{2R} \quad \hat{e}_{3R}) = \begin{pmatrix} \cos(-\alpha_T) & 0 & -\sin(-\alpha_T) \\ 0 & 1 & 0 \\ \sin(-\alpha_T) & 0 & \cos(-\alpha_T) \end{pmatrix} (\hat{e}_{1L} \quad \hat{e}_{2L} \quad \hat{e}_{3L}), \quad (11)$$

where transition angle $\alpha_T$ is defined in eqn. (6).

As an aside, one end of the vector $\vec{r}_H$ as line 440 is coincident with the origin (0, 0, 0) of the local horizontal plane at point 405. The other end lies at $(r_x, r_y, 0)$ in the local horizontal coordinate system 510. For the remote horizontal coordinate system 520, the other end of the position vector $\vec{r}_H$ lies along the remote vertical axis (direction of $\hat{e}_{3R}$) that runs in the remote horizontal coordinate system 520 through either the origin (0, 0, 0) or else the coordinates (0, 0, alt).

From this, the coordinates for the remote radially-aligned target velocity coordinate system 520 are formed by the calculation in eqn. (12):

$$\vec{v}_T = (\hat{e}_{1R}\hat{e}_{2R}\hat{e}_{3R})^T \vec{v}_I, \quad (12)$$

which may alternatively be written as eqn. (13):

$$\vec{v}_T = \begin{pmatrix} v_{xT} \\ v_{yT} \\ v_{zT} \end{pmatrix} = \begin{pmatrix} \hat{e}_{1R} \cdot \vec{v}_I \\ \hat{e}_{2R} \cdot \vec{v}_I \\ \hat{e}_{3R} \cdot \vec{v}_I \end{pmatrix}. \quad (13)$$

In this manner, the target velocity vector $\vec{v}_T$ may be expressed as a transformation from the intermediate velocity vector $\vec{v}_I$ using unit transformation coordinates.

Upon establishing the coordinates, the calculation is straightforward. For any coordinate system, obtaining the flight path angle θ or FPA with respect to the horizontal plane involves determining the components of the velocity vector $\vec{v}$ in the horizontal plane for that coordinate system, and subsequently performing the calculation by eqn. (14):

$$\theta = \arccos\left(\frac{|\vec{v}_H|}{|\vec{v}|}\right). \quad (14)$$

The flight path angle θ sought can be determined by eqn. (15):

$$\theta = \arccos\left(\frac{\sqrt{v_{xT}^2 + v_{yT}^2}}{\sqrt{v_{xT}^2 + v_{yT}^2 + v_{xT}^2 + v_{zT}^2}}\right). \quad (15)$$

Consequently, the flight path angle θ>0 if the vertical velocity component of the target horizontal coordinate transition is above zero $v_{zT}$>0. Further, the flight path angle is below zero θ<0 if that same component is below zero $v_{zT}$<0.

FIGS. 6A and 6B list an exemplary text 600 that provides coordinate transition equations in MATLAB code. The transition portion 610 in FIG. 6A lists full equations and intermediate variables used to transform from local horizontal coordinates to the remote horizontal coordinates employed for calculating flight path and subsequent angles. The results portion 620 in FIG. 6B lists the corresponding step-by-step algorithmic process executed to generate the transformation coordinates.

FIGS. 7A through 7E list an exemplary text 700 that provides exemplary annotated calculations for the above processes. FIG. 7A provides a first section 710 that includes definitions 715. FIG. 7B provides a second section 720 for a first method with calculations for unit vectors 722, velocity 724 and rotation 726. FIG. 7C continues with a third section 730 for the first method with calculations for coordinate translation 732, projector 734, velocity magnitude 736 and magnitude of the horizontal component of velocity 738.

FIG. 7D completes the first method with a fourth section 740 with time and angle calculations 742, followed by calculations 744 for a second but conventional method for comparison purposes with simplified assumptions compared to the first method. This is followed by calculations 746 for a third method, also being a less calculation-intensive version of the first method. Thus, both second and third methods employ simplified assumptions compared to the first method. FIG. 7E provides a fifth section 750 with time calculations 755 and printer formats.

An exemplary problem can be demonstrated in association with signal-to-noise. For a vector of variables $$\begin{pmatrix} x \\ y \\ z \end{pmatrix}$$

with standard deviations $$\begin{pmatrix} \sigma_x \\ \sigma_y \\ \sigma_z \end{pmatrix},$$

the expected standard deviations can be summarized for velocity vector error statistics $\sigma_{|\vec{v}|}$ and velocity vector angular error $\sigma_\angle$ based on:

$$|\vec{v}| = \sqrt{x^2 + y^2 + z^2} \quad (16)$$

$$\angle = \arccos\left(\frac{\sqrt{x^2 + y^2}}{\sqrt{x^2 + y^2 + z^2}}\right), \quad (17)$$

such that $v = \sqrt{x^2+y^2+z^2}$ represents a Maxwell-Boltzmann distribution for orthogonal independent variables x, y and z and $g = \sqrt{x^2+y^2}$ represents a Rayleigh distribution. From this, the square of directional coefficient a for each orthogonal direction x, y and z can be determined by:

$$a_x^2 = \int_{-\infty}^{\infty} x^2 p(x) dx \quad (18)$$

$$a_y^2 = \int_{-\infty}^{\infty} y^2 p(y) dy \quad (19)$$

$$a_z^2 = \int_{-\infty}^{\infty} z^2 p(z) dz \quad (20)$$

where p(•) is the probability density function of the independent variable.

From Bar-Shalom, the expected value of a function of a random variable may be provided for expected value E of a function g for random variable x may be provided by integration:

$$E[g(x)] = \int_{-\infty}^{\infty} g(x) p(x) dx, \quad (21)$$

where g(x) represents a deviation in the x variable.

Both Maxwell-Boltzman and Rayleigh distributions can be assumed to have the same standard deviation. The distribution of a function of two well-known distributions can follow a normal (i.e., Gaussian) distribution and have the same standard deviation. The function g defined is the vector angle calculation defined in eqn. (17).

As an exemplary test, a true transient axial displacement vector $\vec{x}(t)$ can be generated as a first step:

$$\vec{x}(t) = \begin{pmatrix} x(t) \\ y(t) \\ z(t) \end{pmatrix} = \begin{pmatrix} m_x t + b_x \\ m_y t + b_y \\ m_z t + b_z \end{pmatrix}, \quad (22)$$

where t is time, m is representative of velocity (linear variation slope) and b is representative of initial position (ordinate intercept, respectively for variable subscripts x, y and z.

As a second step, noise can be added to produce observed values as:

$$\vec{y}(t_k) = \begin{pmatrix} u(t) \\ v(t) \\ w(t) \end{pmatrix} = \begin{pmatrix} m_x t_k + b_x + N_{t_{kx}}(0, \sigma^2) \\ m_y t_k + b_y + N_{t_{ky}}(0, \sigma^2) \\ m_z t_k + b_z + N_{t_{kz}}(0, \sigma^2) \end{pmatrix}, \quad (23)$$

where N, $(0, \sigma^2)$ is representative of normal Gaussian distribution about zero with standard deviation $\sigma$, respectively for variable subscripts x, y and z.

As a third step, true angle $\angle(\vec{x}(t))$ can be computed for the true displacement as:

$$\angle(\vec{x}(t)) = \arccos\left(\frac{\sqrt{x^2 + y^2}}{\sqrt{x^2 + y^2 + z^2}}\right), \quad (24)$$

where x, y and z are true horizontal displacements.

As a fourth step, measured angle $\angle(\vec{y},(t))$ can be computed with the added noise as:

$$\angle(\vec{y}(t)) = \arccos\left(\frac{\sqrt{u^2 + v^2}}{\sqrt{u^2 + v^2 + w^2}}\right), \quad (25)$$

where u, v and w are the horizontal displacements with added noise, for these relations.

As a fifth step, a difference function $\Delta(t)$ can be computed as:

$$\Delta(t) = |\angle(\vec{x}(t)) - \angle(\vec{y}(t))|, \quad (26)$$

with the difference function representing the absolute value of the differences between true angle $\angle(\vec{x}(t))$ and noisy measured angle $\angle(\vec{y}(t))$.

For a numerical example, true vector $\vec{x}$ values for true displacements (x, y, z) can be (3, 4, 5) in scalar form. These values would yield true angle value of 45°. For the corresponding measured vector $\vec{y}$ values to be extremely noisy, this may produce measured displacements (u, v, w)=(5.5, 6.5, 7.5). Under this circumstance, the measured angle would be 41.4°.

Alternatively, for corresponding measured values being nominally noisy with measured displacements may be (u, v, w)=(3.25, 4.25, 5.25), the measured angle would be 44.5°. For corresponding measured values being only slightly noisy, measured displacements correspond to (u, v, w)=(3.025, 4.025, 5.025). For that example, the measured angle would be 44.9°. Consequently, the difference function $\Delta(t)$ can be plotted in a histogram.

Figure 8:
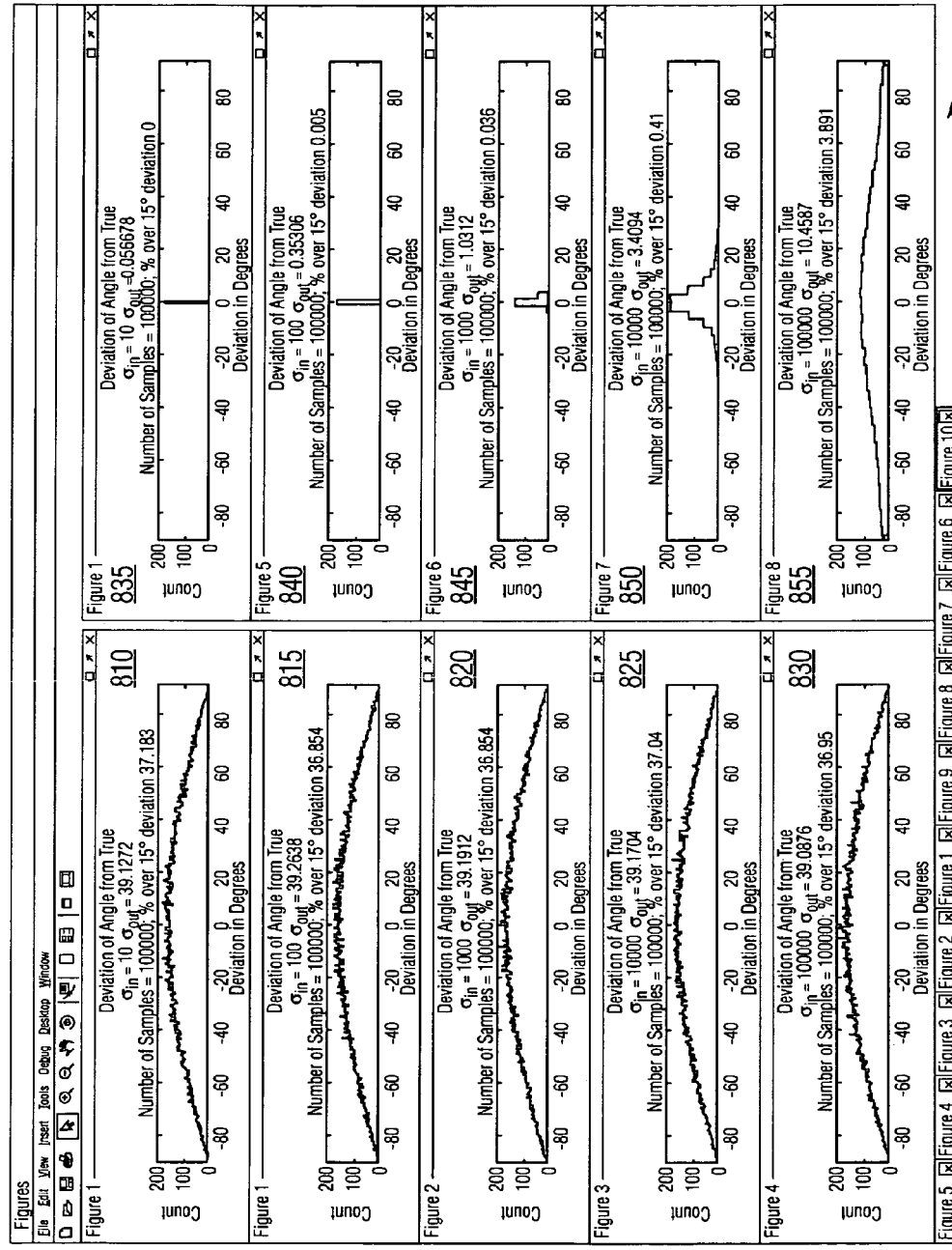
FIG. 8 is a graphical interface view of angle deviation profiles.

FIG. 8 shows a windows view 800 of angle deviations with ten example histograms, each with 100,000 samples showing maximum counts varying as deviation in degrees. Plots 810, 815, 820, 825 and 830 show counts ranging up to two-hundred, with apparently little output standard deviation $\sigma_{out} \sim 39$ despite variation between these plots of input standard deviation from $\sigma_{in}=10$ to $\sigma_{in}=100,000$. By contrast, plots 835, 840, 845, 850 and 855 show maximum counts from about two-thousand and ten-thousand, despite the similarly wide range in input standard, but with output standard deviation constrained between less than one-tenth to slightly over ten.

Plots 810 and 835 demonstrate the difference in response to increasing the original magnitude of the input quantities. At all the left-side plots, their respective fixed points (x, y, z) are set to zero. This is followed by performing the angle calculation with noisy values, resulting in an arbitrary angle calculated from noisy zeroes. On the right-side, the point values (x, y, z) have been increased while maintaining a fixed measurement noise.

This causes (somewhat unintentionally) the original magnitude of the vector (x, y, z) to increase with respect to the noise. This was realized to be similar to a signal-to-noise type problem. Typically, the greater the vector length, the less likely that its direction is be affected by comparatively small noise. The high speed of missiles constitutes a benefit to this aspect of the problem.

For the graphical views 800, the left-side histogram plots 810, 815, 820, 825 and 830 have steady-state conditions as x(t)=y(t)=z(t)=0. The right-side histogram plots 835, 840, 845, 850 and 855 are transient, with x(t)=y(t)=25.0×t and z(t)=0.1×t. For both sides, true x, y and z values can be computed to calculate true angle. Also, noisy x, y and z as u, v and w values can be computed for a noisy angle $\angle(t)$. The difference $\Delta(t)$ can be calculated between true and noisy angles, and can be plotted as histograms.

FIGS. 9A and 9B show expected standard deviation plot views 900 of deviation as a function of signal-to-noise ratio based on empirical comparisons of simulated results. For plot 910 in FIG. 9A, x(t)=y(t)=0 and z(t)=a constant. This was selected for simplicity, because the accompanying assumption of uniform noise for each coordinate implies the problem can typically be trans-formed into the problem considered.

For plot 920 in FIG. 9B, the expected value integral provides the analytical predicted maximum 970 based on an integral restriction:

$$E[L^2] \leq \int_0^{\frac{\pi}{2}} e^{-\frac{k^2}{2}\cos^2\phi}(1) \cdot \phi^2 \cos\phi \cdot d\phi, \quad (27)$$

where k represents the ratio between the original constant z and the noise standard deviation value $\sigma_x$ (i.e., signal-to-noise ratio in the corresponding direction), and $\phi$ represents the deviation angle. For both plots, signal-to-noise ratio represents the abscissa 930 and standard deviation represents the ordinate 940.

The first expected plot 910 features results from a fixed length z against a variable input noise, calculating output statistics of the distance function in a simulation curve 950. The second expected plot 920 includes a legend 960 identifying an analytical predicted curve 970 of eqn. (27) and a simulated actual curve 980, which corresponds to the same curve 950 of plot 910.

The deviation angle φ in eqn. (27) represents a variable of integration developed based on transformation from Cartesian coordinates to spherical coordinates when attempting to evaluate the three-dimensional version of eqn. (21), which is not readily amenable to closed-form solutions. Thus, the solutions presented employ a Monte Carlo type approach for generating an expectation plot 910 in FIG. 9A, and providing an adequate approximation plot 920 in FIG. 9B.

The approach described herein has resulted from an investigation into resolving considerations for operating an existing conventional system. The conventional system included ability to indicate circumstances in which an observed track exhibits ballistic behavior. Many analytical paths have been investigated to distinguish ballistic and flight trajectories. The difference method provides the most preferred results, and from approximating the Expectation integral of eqn. (21) due to difficulty in developing closed solutions.

Figure 10:
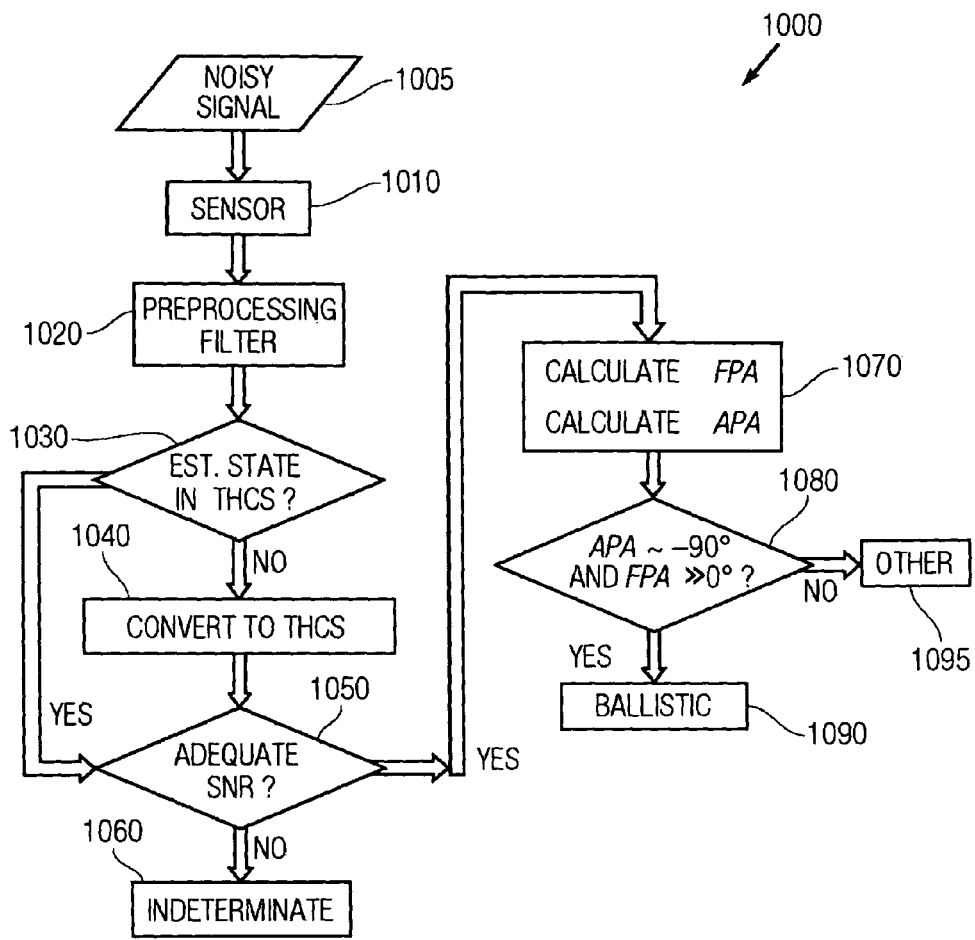
FIG. 10 is a flowchart identifying the procedural process for ballistic missile determination.

FIG. 10 shows a flowchart diagram 1000 of a bogey identification process for designation as a ballistic missile target. A noisy signal 1005, such as radar return energy from the bogey, reaches a sensor 1010 that detects the signal 1005. The sensor 1010 submits that information to a preprocessing filter 1020 for estimating the observed bogey state, including its position and velocity. The altitude of the bogey can also be determined from its relative position in relation to earth's radius.

A coordinate query 1030 can be performed on the resulting estimated state as to whether that state is provided in the target horizontal coordinate system (THCS). If false (as generally expected), the process diverts to a conversion operation 1040 using the coordinate transformations described above. Then, or otherwise if the query is true, the process proceeds to a signal quality query 1050 as to whether the filtered and transformed state has an adequate signal-to-noise (SNR) ratio. If not, the process determines at operation 1060 that the bogey's state is indeterminate, and that further information may be required. Noisy signals compromise the ability to determine acceleration, unless change in velocity exceeds some SNR threshold, such as for a ballistic missile.

If SNR is adequate, the process diverts to a calculation operation 1070 to determine flight path and acceleration path angles (FPA and APA) respectively from eqns. (1) and (5). A trajectory decision query 1080 uses the calculated path angles to inquire whether acceleration path angle vertically points downward (∼−90°, and whether flight path angle is significantly greater than zero) (>>0°). For a bogey in which both conditions are satisfied, the process determines that the signal 1005 indicates a ballistic target 1090. Otherwise at 1095, such a determination cannot be made, such that the bogey constitutes a possible aircraft or other aerial object.

These operations, and portions thereof, can be performed as operational steps being performable by machine operation—e.g., a programmable code for a general purpose computer, or else an ASIC. The process results in an automated determination, based on noisy input data and optional transformations, with an identity determination that a bogey constitutes a ballistic threat.

The considerations are indicated in letter from Naval Surface Warfare Center, Dahlgren Division to Aegis Ballistic Missile Defense Program Office, reference 9000 Ser WO5/058, "Certification of Aegis Ballistic Missile Defense (BMD) Aegis Weapon System (AWS) Baseline 3.6.1.1 Computer Programs", dated 20 Mar. 2009.

In summary, conventional systems rely on information other than velocity and are sensitive either to relative position information or to delays in reporting the alternative information. Testing indicated the referenced system would perform poorly against certain types of targets, which led to an examination of techniques in use by that system, and subsequent development of the exemplary process described above.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A computer-implemented analysis method executed on an automated processor for determining whether a flight trajectory of a bogey relative to Earth's surface constitutes either a ballistic projectile or else a non-ballistic projectile, said method comprising:

obtaining first and second positions of the bogey separated by a first time interval;

calculating a first difference between said first and second positions divided by said first time interval to obtain a first velocity vector;

obtaining a third position of the bogey separated from said second position by a second time interval;

calculating a second difference between said second and third positions divided by said second time interval to obtain a second velocity vector;

calculating a third difference between said first and second velocity vectors divided by said second time interval to obtain an acceleration vector;

determining a negative flight path state of whether said first velocity vector exceeds said second velocity vector as being valid;

determining a negative acceleration path state of whether said acceleration vector is negative and substantially perpendicular to the Earth's surface as being valid; and reporting an identified threat that the bogey represents the ballistic projectile in response to said negative flight path and negative acceleration path states are both valid, and as the non-ballistic projectile otherwise.

2. The method according to claim 1, further including:

translating said first and second velocity vectors in a local observed co-ordinate system into transform velocity vectors in an alternate coordinate system, and replacing said velocity vectors with said transformed velocity vectors.

3. The method according to claim 1, wherein determining one of said velocity vectors by:

$$FPA_i = \text{sign}(v_{z,i})\arccos\left(\frac{\sqrt{v_{x,i}^2 + v_{y,i}^2}}{\sqrt{v_{x,i}^2 + v_{y,i}^2 + v_{z,i}^2}}\right),$$

where $FPA_i$ is flight path angle at interval i, $v_{x,i}$, $v_{y,i}$ and $v_{z,i}$ represent velocity components in the axial. lateral and vertical directions for said interval, and $$APA_i = \text{sign}(a_{z,i})\arccos\left(\frac{\sqrt{a_{x,i}^2 + a_{y,i}^2}}{\sqrt{a_{x,i}^2 + a_{y,i}^2 + a_{z,i}^2}}\right),$$

where $APA_i$ is flight path angle at said interval, $\alpha_{x,i}$, $\alpha_{y,i}$ and $\alpha_{z,i}$ represent acceleration components in the axial, lateral and vertical directions for said interval.

4. The method according to claim 2, wherein translating said velocity vectors into said alternate coordinate system further includes:
   translating said velocity vectors from a local observation coordinate system having a horizontal plane into an intermediate coordinate system in said horizontal plane as intermediate velocity vectors; and
   translating said intermediate velocity vectors from said intermediate coordinate system into a remote coordinate system as target transformed velocity vectors.

5. The method according to claim 4, wherein said acceleration components are determined as $$a_{x,i} = \frac{v_{x,i} - v_{x,i-1}}{t_i - t_{i-1}},\ a_{y,i} = \frac{v_{y,i} - v_{y,i-1}}{t_i - t_{i-1}},\ \text{and}\ a_{z,i} = \frac{v_{z,i} - v_{z,i-1}}{t_i - t_{i-1}}.$$

\* \* \* \* \*